UNITED STATES PATENT OFFICE.

STEWART F. ALFORD, OF GOSHEN SPRINGS, MISSISSIPPI.

IMPROVEMENT IN MEDICAL COMPOUNDS FOR GONORRHEA, &c.

Specification forming part of Letters Patent No. 132,425, dated October 22, 1872.

*To all whom it may concern:*

Be it known that I, STEWART F. ALFORD, of Goshen Springs, in the county of Rankin and State of Mississippi, have invented a new and Improved Medical Compound; and that the following is a full, clear, and exact description of the same.

The object of this invention is to produce a medical compound that shall alleviate or cure local inflammations, and also be a specific for the cure of gonorrhea. The invention consists in combining, either in liquid or powdered form, the ingredients hereinafter named.

The compound consists of equal parts of pulverized charcoal, alum, and the leaves of a plant of the genus Solidago, commonly known as the golden rod. These several ingredients are intimately mixed together, and are to be applied to the parts affected either without further preparation, as a powder, or a strong decoction may be made therefrom and the liquid applied.

Having thus described my invention, what I claim as new, and desire to secure by Letters Patent, is—

The within-described ingredients, mixed or compounded in or about the proportions set forth, as and for the purpose specified.

S. F. ALFORD.

Witnesses:
PAT HENRY,
WILL HENRY.